(12) United States Patent
Zachmann et al.

(10) Patent No.: US 12,162,362 B2
(45) Date of Patent: Dec. 10, 2024

(54) SYSTEMS AND METHODS FOR CONTROLLING ENGINE SPEED

(71) Applicant: Doosan Bobcat North America, Inc., West Fargo, ND (US)

(72) Inventors: Boston Zachmann, Bismarck, ND (US); Chad Swenson, Bismarck, ND (US)

(73) Assignee: Doosan Bobcat North American, Inc., West Fargo, ND (US)

( * ) Notice: Subject to any disclaimer, the term of this patent is extended or adjusted under 35 U.S.C. 154(b) by 82 days.

(21) Appl. No.: 17/728,555

(22) Filed: Apr. 25, 2022

(65) Prior Publication Data

US 2022/0340016 A1 Oct. 27, 2022

Related U.S. Application Data

(60) Provisional application No. 63/178,596, filed on Apr. 23, 2021.

(51) Int. Cl.
*B60L 15/20* (2006.01)
*F02D 29/04* (2006.01)

(52) U.S. Cl.
CPC .............. *B60L 15/20* (2013.01); *F02D 29/04* (2013.01); *F02D 2200/101* (2013.01)

(58) Field of Classification Search
CPC .... B60L 15/20; F02D 29/04; F02D 2200/101; E02F 9/2235; E02F 9/2253; E02F 9/2246
See application file for complete search history.

(56) References Cited

U.S. PATENT DOCUMENTS

| | | | |
|---|---|---|---|
| 5,525,043 A | 6/1996 | Lukich | |
| 6,941,688 B2* | 9/2005 | Ichimura | E02F 9/2246 172/3 |
| 7,845,168 B2 | 12/2010 | Pruitt et al. | |
| 8,457,848 B2 | 6/2013 | Eastman et al. | |
| 8,983,739 B2 | 3/2015 | Faivre | |
| 9,671,763 B2 | 6/2017 | Ishihara et al. | |
| 10,619,330 B2* | 4/2020 | Becker | B60W 30/1886 |
| 10,710,591 B2 | 7/2020 | Palmroth et al. | |
| 2009/0031721 A1* | 2/2009 | Palo | E02F 9/2232 60/449 |
| 2010/0179735 A1* | 7/2010 | Ekvall | E02F 9/2062 701/50 |
| 2011/0167811 A1* | 7/2011 | Kawaguchi | F04B 49/065 60/395 |
| 2013/0325293 A1* | 12/2013 | Jacobson | F02D 41/021 701/103 |
| 2018/0009309 A1 | 1/2018 | Maringer et al. | |

(Continued)

FOREIGN PATENT DOCUMENTS

| | | |
|---|---|---|
| EP | 2543776 A1 | 1/2013 |
| EP | 3318681 A1 | 5/2018 |

(Continued)

*Primary Examiner* — Kurt Philip Liethen
(74) *Attorney, Agent, or Firm* — Quarles & Brady LLP

(57) ABSTRACT

A power machine can include an engine control module configured to determine a target operational speed of the power machine and control the engine based on the target operational speed. A drive controller can be configured to control operation of a hydraulic drive pump or other work element to decrease engine speed toward a target stabilization speed that is lower than the target operational speed.

20 Claims, 8 Drawing Sheets

(56) References Cited

U.S. PATENT DOCUMENTS

| | | | |
|---|---|---|---|
| 2018/0230677 A1* | 8/2018 | Becker | E02F 9/2235 |
| 2019/0136487 A1 | 5/2019 | Reinhardt et al. | |
| 2020/0080551 A1* | 3/2020 | Caldwell | E02F 9/2246 |
| 2020/0115886 A1* | 4/2020 | Horii | F16H 61/431 |

FOREIGN PATENT DOCUMENTS

| | | | |
|---|---|---|---|
| EP | 3620582 A1 | 3/2020 | |
| WO | 2019206434 A1 | 10/2019 | |

\* cited by examiner

SYSTEMS AND METHODS FOR CONTROLLING ENGINE SPEED

CROSS-REFERENCE TO RELATED APPLICATIONS

This application is based on, claims priority to, and incorporates herein by reference in its entirety, U.S. Provisional Patent Application No. 63/178,596, filed on Apr. 23, 2021, and entitled "Systems and Methods for Controlling Engine Speed".

BACKGROUND

This disclosure is directed toward power machines. More particularly, this disclosure provides systems and methods for controlling engine speed on a power machine. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

In general, power machines can include an engine controller, which can also be referred to as an engine control unit ("ECU"). The engine controller can be utilized to control an engine's operating conditions to reach and maintain a target operational speed for a power machine (i.e., a target RPM). An engine controller can generally attempt to automatically recover from an engine droop condition by adjusting engine torque, to return to and maintain a target operational speed.

The discussion above is merely provided for general background information and is not intended to be used as an aid in determining the scope of the claimed subject matter.

SUMMARY

Embodiments of the disclosed subject matter can use a controller to reduce the speed of an engine on a power machine below a target operational speed set by the engine controller by modifying the load on the engine. Among other benefits, this may help to ensure that optimal power is provided to a drive system.

In some embodiments, a method of managing operation of an engine of a power machine is provided. The method can include determining, with one or more computing devices, a target stabilization speed for the engine. The target stabilization speed is slower than a target operational speed for the engine. An engine controller is configured to control operation of the engine based on the target operational speed. The method can also include receiving, at the one or more computing devices, an input command for operation of a work element of the power machine, and controlling operation of the work element, with the one or more computing devices, based on the target stabilization speed and the input command, to cause the engine to operate below the target operational speed.

In some embodiments, a power machine is provided. The power machine can include a main frame, a power source configured to provide a rotational output, a first work element configured as a hydraulic drive pump of a hydraulic drive system, supported by the main frame and powered by the power source, a second work element supported by the main frame and powered by the power source, and a control system. The control system can include a power source control module configured to control operation of the power source based on a target operational speed of the rotational output of the power source, and a drive control module configured to control operation of the hydraulic drive pump based on an operator input for operation of the hydraulic drive system and on a target stabilization speed for the rotational output of the power source that is lower than the target operational speed.

In some embodiments, a control system for a power machine is provided. The power machine can include an engine, a first hydraulic work element that is powered by the engine, and a second hydraulic work element that is powered by the engine. The control system can include an input device configured to receive commands for operation of the first hydraulic work element, an engine speed sensor configured to determine current engine speed, and one or more electronic control devices. The one or more electronic control devices are configured to receive an operator command for operation of the first hydraulic work element, receive an indication of the current engine speed, and determine a target stabilization speed for the engine based on a current load for the second hydraulic work element and a current throttle setting, and control operation of the first hydraulic work element. The target stabilization speed is slower than a target operational engine speed for the engine. When a load on the engine causes the current engine speed to droop below the target operational engine speed, control of the operation of the first hydraulic work element can include modulating the operator command for the first hydraulic work element based on the target stabilization speed.

This Summary and the Abstract are provided to introduce a selection of concepts in a simplified form that are further described below in the Detailed Description. This Summary is not intended to identify key features or essential features of the claimed subject matter, nor are they intended to be used as an aid in determining the scope of the claimed subject matter.

DRAWINGS

DETAILED DESCRIPTION

Figure 1:
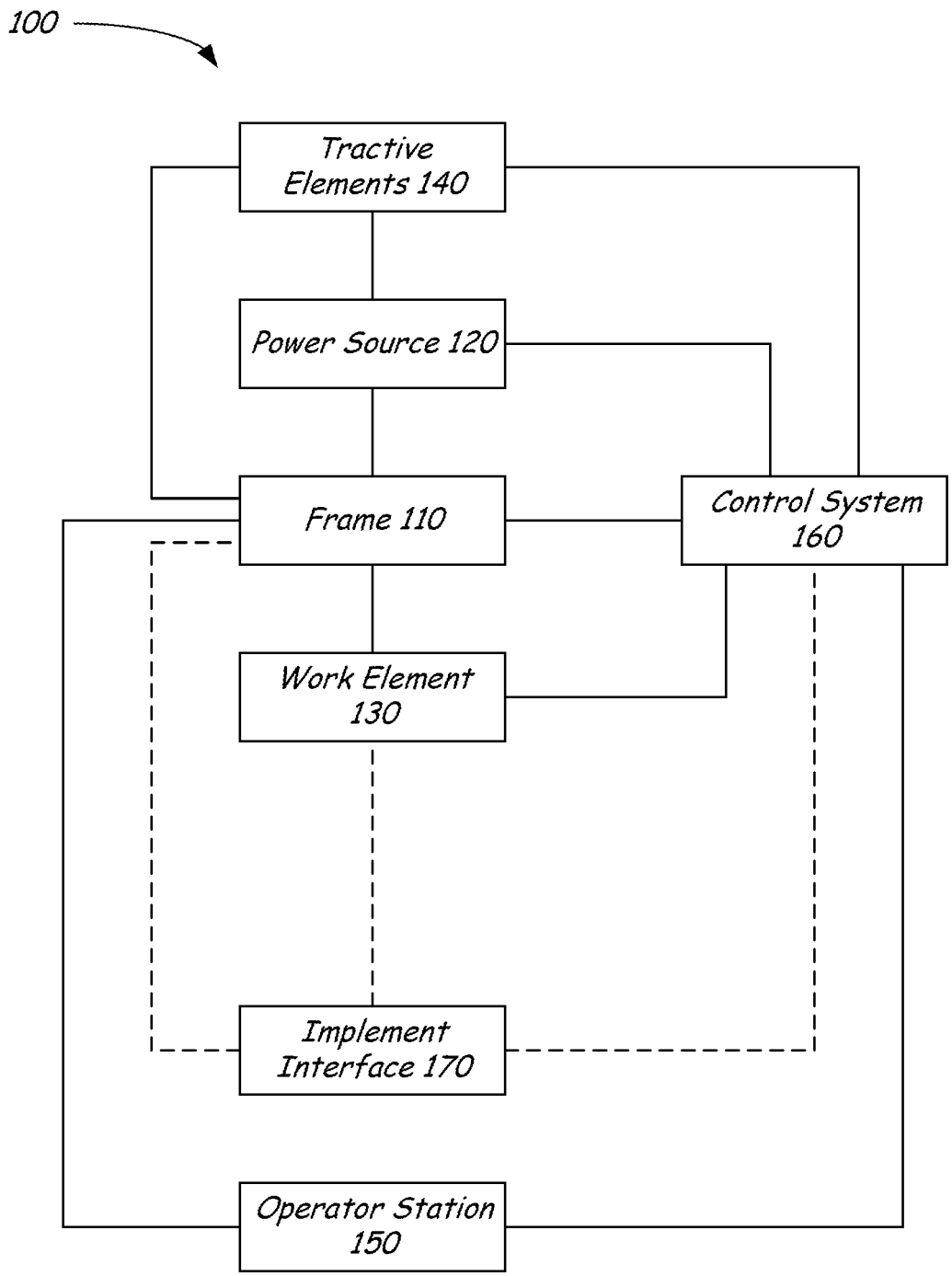
FIG. 1 is a block diagram illustrating functional systems of a representative power machine on which embodiments of the present disclosure can be advantageously practiced.

The concepts disclosed in this discussion are described and illustrated by referring to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Under conventional designs, power machines may be equipped with an engine controller. The engine controller is typically configured to try to maintain a target operational speed (e.g., a speed with maximum power capability of an engine at a given throttle setting) and to try to recover to the target operational speed should the engine encounter a droop condition. A droop condition (or engine "droop") can be defined as a reduction in engine speed due to engine load (e.g., to below a target operational speed set by an engine controller). Known engine controllers can attempt to recover from a droop condition by increasing or decreasing the torque provided by the engine to reach and maintain the target operational speed. The engine controller may adjust, among others, engine parameters such as fuel flow, ignition timing, valve timing, throttle body position, and manifold pressure in an effort to recover from the droop condition.

Increased loads that can cause engine droop are generally caused by torque or power demands from work elements, including tractive elements (e.g., hydrostatic pumps to power drive operations), workgroup elements (e.g., pumps for lift cylinders, tilt cylinders for buckets or other implements, mower elements, etc.), and accessory elements (e.g., engine fans, air conditioning systems, etc.). As generally noted above, if the cumulative demand from the work elements causes the engine to droop (or even stall), the engine controller will generally try to increase torque output, subject to the maximum torque capability of the engine, to attempt to return the engine to a target operational speed. If additional torque is available, an engine controller may thus cause engine speed to recover toward the target operational speed. However, if demands from work elements exceed engine capacity, the engine controller may be unable to cause the engine to recover from the droop condition. This can frequently occur during power machine operations, including when work groups are fully engaged (e.g., are operating at relief pressure for digging, grading, or other operations) and an operator commands power to the wheels.

Experienced operators can sometimes detect or anticipate engine droop and actively reduce work element demands (e.g., by backing off drive control levers) to help an engine recover. However, this control is difficult as well as imprecise. Thus, it is common for operators to experience suboptimal power conditions during a variety of operations. In some power machines, horsepower management systems can modulate operator inputs to help prevent engine stall. However, conventional approaches can cause an engine to exhibit unpredictable stabilization behavior during droop, with multiple potential engine-speed equilibrium points. This may sometimes result suboptimal performance, including operation with limited drive speed even when overall power demand on an engine is low.

Systems and methods according to the disclosure can provide improved power management for power machines, including to improve power delivery to tractive elements (e.g., hydrostatic drive pumps) during high-load operation of workgroup elements or other non-traction torque demands. Correspondingly, some embodiments can help to maximize power delivered to a drive system, while also maintaining serviceable function of work elements, when total demand on the engine exceeds engine capacity.

Some embodiments can include indirect control of engine speed, via control of the loading of one or more work element. In some cases, for example, displacement of a drive pump can be controlled to change the loading of an engine by the pump, and to thus direct the engine toward a target stabilization speed that can provide optimal power delivery. Under some conditions, a target stabilization speed for optimal power delivery to work elements can be different from a target operational speed of an engine controller (e.g., with the latter corresponding to maximum power output for an engine, at a given throttle position). For example, at a full load condition for workgroup elements or other non-tractive loads, a target stabilization speed for maximized power delivery to a drive group may be substantially lower than a target operational speed set by an engine controller. Thus, in some embodiments, control systems and methods according to the disclosure can work contrary to efforts by an engine controller to adjust engine speed.

In general, in control systems according to the disclosure, an electronic controller can be configured to modify operator inputs that command operation of work elements, based on a determined target stabilization speed, to increase the power demand from the work elements. In some embodiments, a controller can monitor current operating conditions (e.g., current throttle setting, engine speed, workgroup loads, drive group pump displacement, etc.) to determine a target stabilization speed at which optimal power delivery can be achieved (e.g., maximum power delivery to a tractive element) and control a work element accordingly. For example, when an engine is in a droop condition and an operator commands operation of a work element (e.g., a tractive element), a controller can modify the operator commands to try to cause engine speed to approach a target stabilization speed that will optimize power delivery to the work element (e.g., but not maximum overall power delivery by the engine). For example, a limit on drive pump displacement or torque can be specified for a relevant pump, as may correspond to operation of an engine at a target stabilization speed, and operator commands for torque can be scaled accordingly. Thus, with maximum torque demand at the tractive elements, as commanded by an operator, the engine may be pulled toward an optimal condition for power delivery to particular work elements (e.g., drive pumps).

As noted above, a target stabilization speed can generally be different (and generally lower) than a target operational speed for an engine. Accordingly, as also noted above, control of work elements to pull engine speed toward a target stabilization speed may act contrary to the control strategy of known engine controllers (as generally discussed above). In this regard, however, as long as demands from work elements exceed engine capacity, an engine controller will not be able to increase torque to recover to the target operational speed, and improved performance, at (or approaching) the target stabilization speed, can be achieved. Further, during engine droop, an engine controller will generally continue to increase torque, as much as possible, to try to recover to a target operational speed. Thus, via control toward a target stabilization speed, the engine controller can be effectively primed to more rapidly increase engine output, in the event that more torque becomes available.

In some embodiments, control of a work element based on target stabilization speed (e.g., as generally discussed above) can be implemented by one or more controllers that are separate from an engine controller. For example, some power machines may include dedicated controllers for engine control, drive control, operator input, and hub operations, with appropriate communication channels (e.g., buses) among the controllers and between the controllers and other components (e.g., speed, position, or pressure sensors). In some embodiments, multiple controllers may be combined as modules within a common control device (e.g., as different software or hardware modules for a single controller). In this regard, the term "dedicated" is used herein to indicate that a controller for a particular set of functions is a separate device from another controller. For example, in some configurations a dedicated engine controller may be in communication with a dedicated hub controller (i.e., a main controller), which may in turn be in communication with a dedicated drive controller, etc. Controllers not expressly labeled herein as "dedicated" controllers can be considered to be configured as dedicated controllers or as being integrated into a larger control device.

Figure 2:
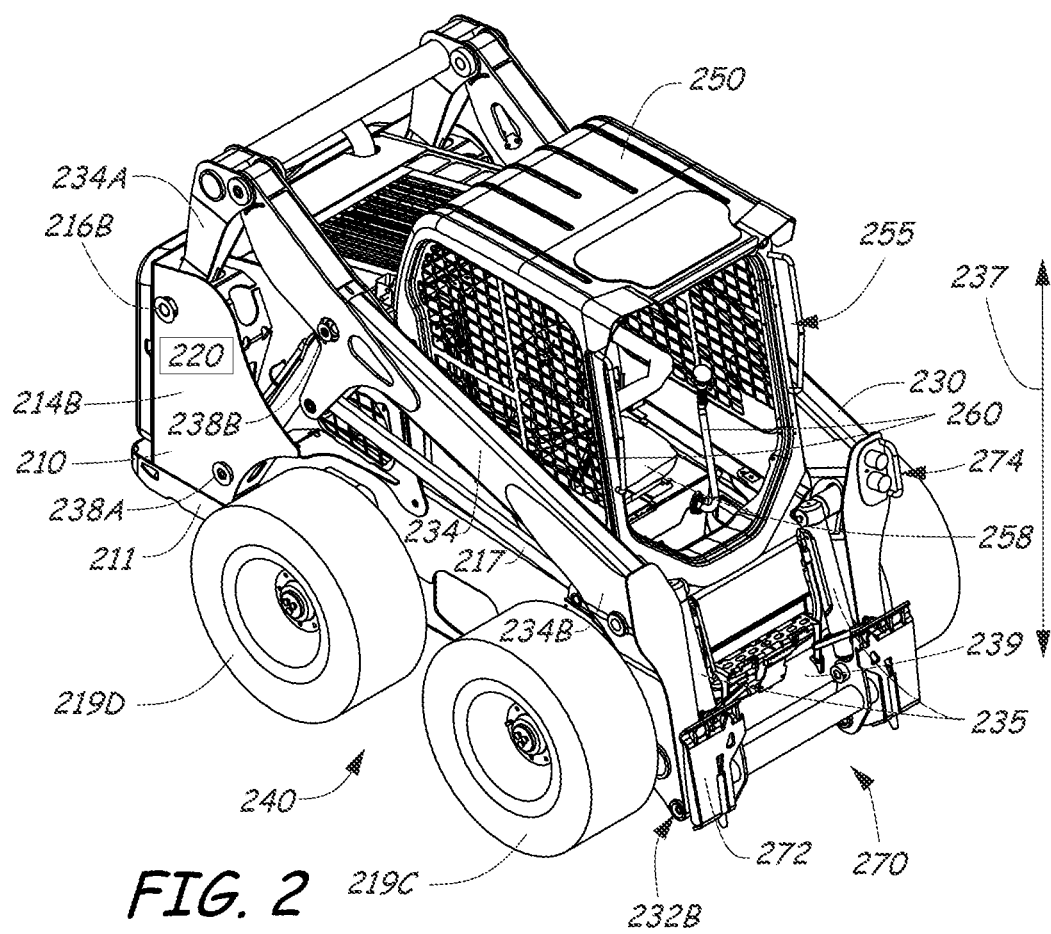
FIG. 2 illustrates a first perspective view of a representative power machine in the form of a skid-steer loader of the type on which the disclosed embodiments can be practiced.
Figure 3:
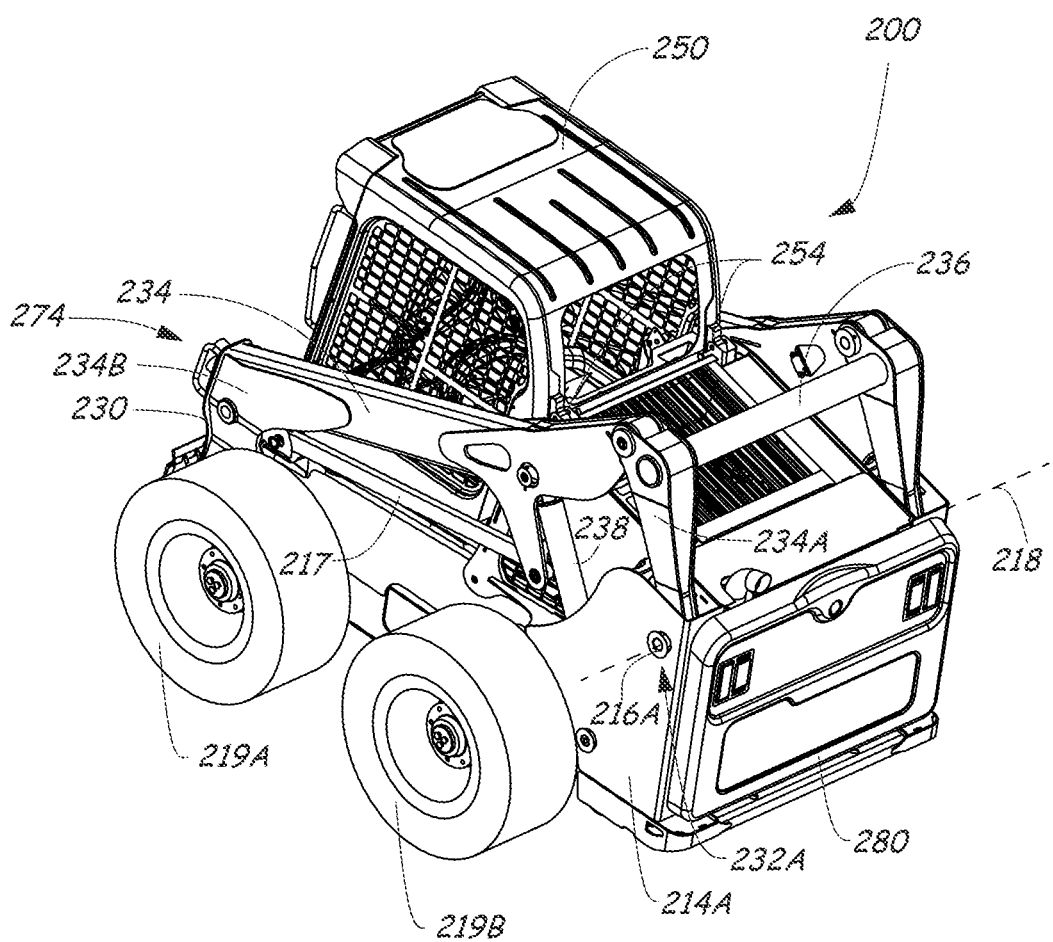
FIG. 3 illustrates a second perspective view of the power machine of FIG. 2.

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine with a rotational output (e.g., a crankshaft, flywheel, etc.) and a power conversion system such as a mechanical transmission or a hydraulic system that is configured to convert the rotational output from an engine into a form of power that is usable by a work element. Other types of power sources can be incorporated into power machines, including electrical sources or a combination of power sources, known generally as hybrid power sources. Power sources for power machines, relative to the technology discussed herein, can additionally or alternatively include electric motors having a rotational output and a battery (or other electrical energy storage or power delivery system) coupled to the electric motor to power the rotation thereof.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and that can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and secure various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to providing dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the loader 200 to allow communication between a controller on an implement and electronic devices on the loader 200.

Figure 4:
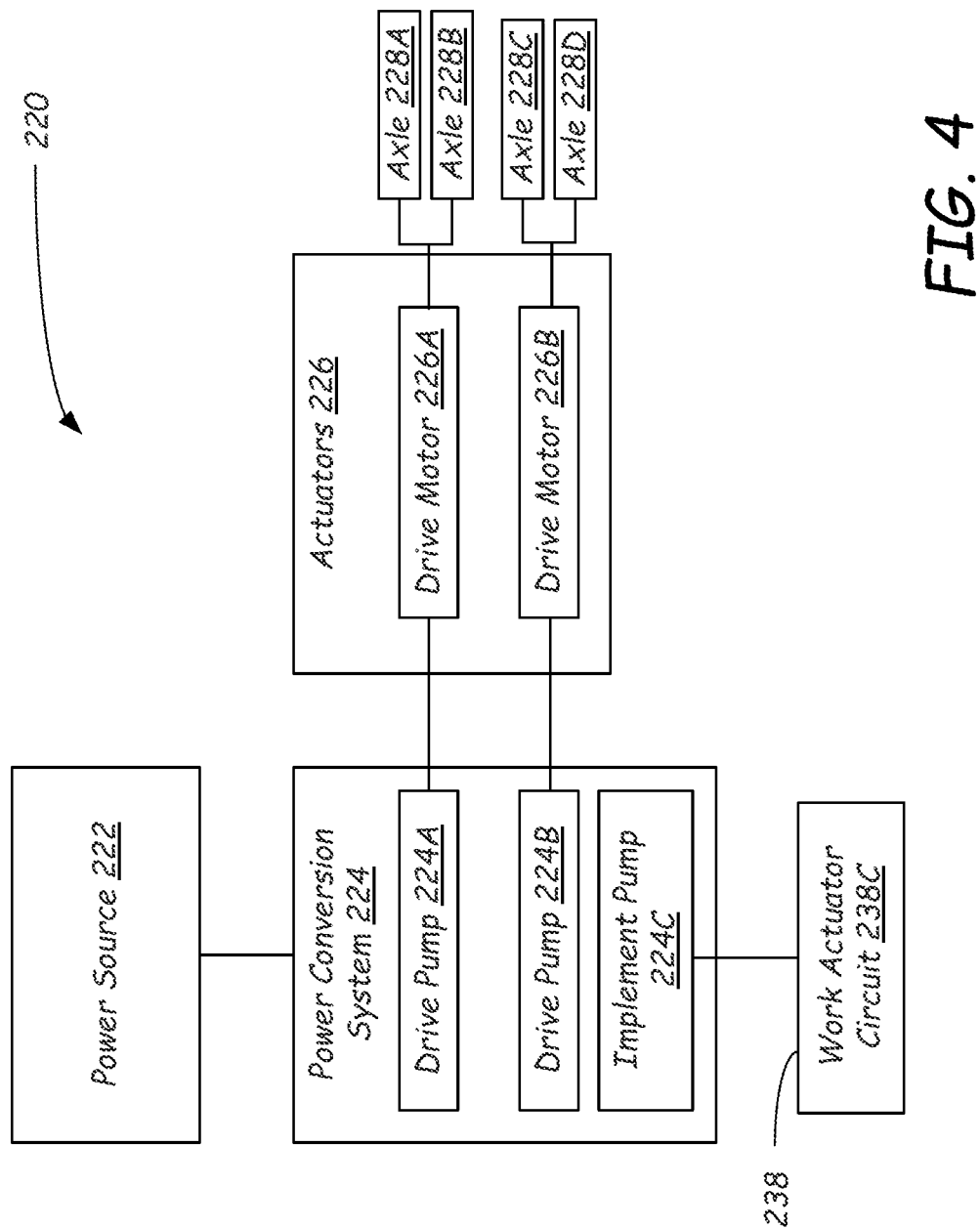
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that can provide power for given power machine components, including battery-powered (or other) electric motors. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238C includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3 spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
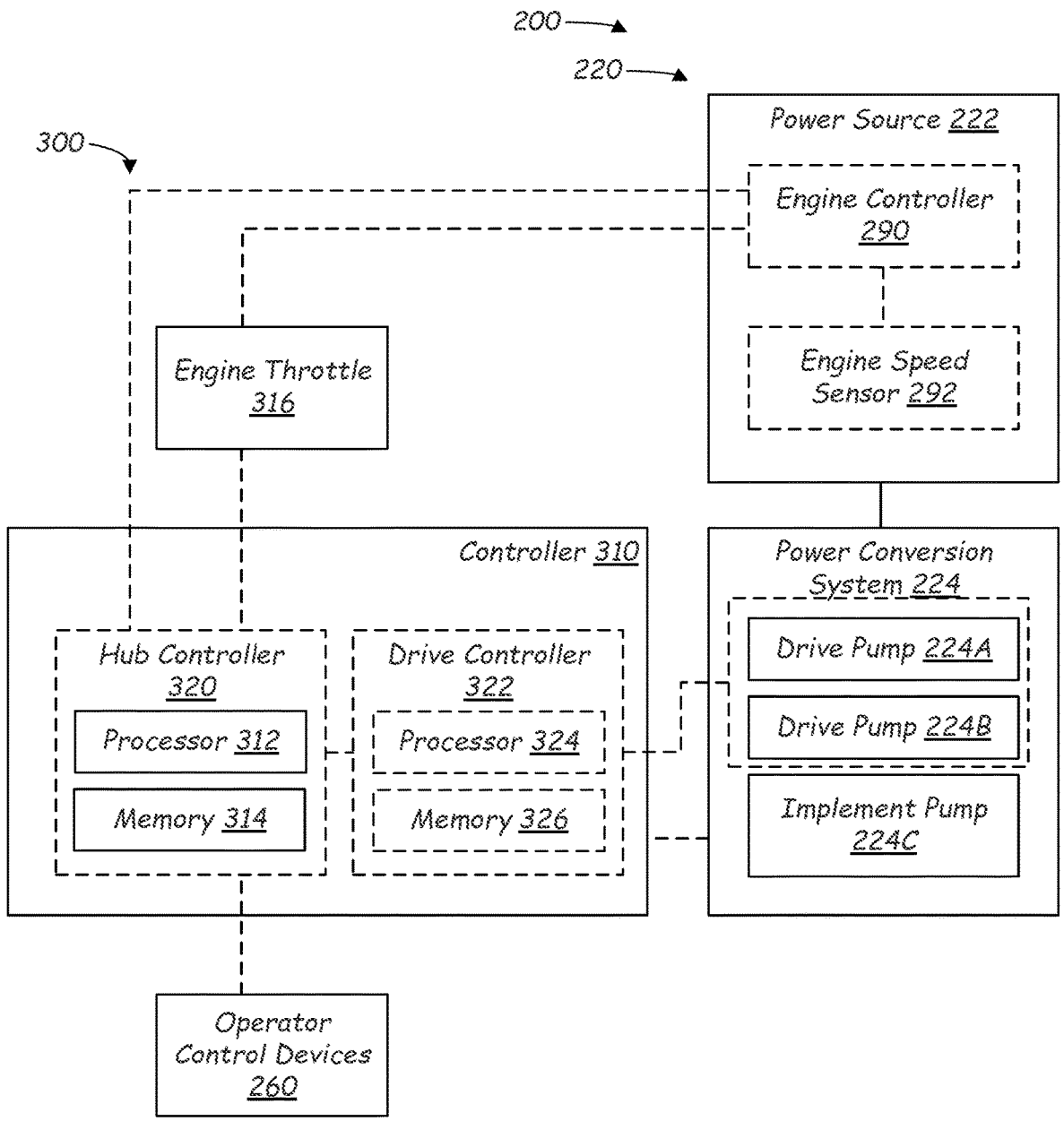
FIG. 5 is a block diagram illustrating components of a control system for control of an engine and a power conversion system according to some of the disclosed embodiments.

FIG. 5 includes a diagram of a control system 300 for a power machine according to an embodiment of the disclosure, as well as other related components. As generally discussed above, and further detailed below, the control system 300 can be configured to cause an engine of a power machine to approach at target stabilization speed that is below a target operational speed set by an engine controller, and to thereby provide improved power delivery for work elements as compared to conventional systems. Although the control system 300 is illustrated in the context of certain components of the loader 200 (see, e.g., FIGS. 2 and 3), the control system 300 and other similar systems according to this disclosure can be advantageously used with other power machines having a variety of configurations for power trains, work elements, or other systems. Further, although particular controllers are illustrated in FIG. 5 as dedicated controllers, other embodiments may include other configurations, including with one or more controllers configured as integrated modules of common control devices.

As illustrated in FIG. 5, the control system 300 generally includes a controller 310 (e.g., a general or special purpose computer device). In some embodiments, the controller 310 can be integrated into a larger control system such as the control system 160 (see FIG. 1), including as a hardware or software module of a general purpose control system for a power machine, or as an assembly of one or more dedicated control devices.

Along with other connections, including as further discussed below, the controller 310 is in electronic communication with the engine controller 290 of the power source 222 via a bus connection, although other configurations may be possible. For example, in some embodiments, the engine controller 290 can form part of the controller 310 (or vice versa).

The engine controller 290 is configured to control the power source 222, which is an internal combustion engine in this case, to cause the power source/engine 222 to operate (or try to operate) at a target operational speed. However, as also noted above, the power source 222 can also be configured as a battery-powered electric motor that is controllable with a motor controller to control rotational output of the power source. In such a configuration, the control methods described herein could be carried out in the same or similar fashion as described herein, including relative to the operations illustrated in FIGS. 6 and 8. According to some embodiments, the target operational speed can be determined by a position of an engine throttle 316 that is in communication with the engine controller 290. Generally, the engine throttle 316 is an operator controlled hand or foot device, although other configurations are possible a throttle. Different positions of the engine throttle 316 can, for example, be pre-mapped to different corresponding target operational speeds, and the engine controller 290 can then operate to try to cause the engine 222 to reach and maintain the relevant target operational speed based on the position of the engine throttle 316. For example, for some power machines, 100% throttle input can correspond to a maximum target operational speed (e.g., 2600 RPM). As also discussed above, the engine controller 290 may generally operate to increase or decrease torque for the engine 222 in order to control engine speed, including increasing or decreasing torque, as needed, to try and achieve the target operational speed.

The engine controller 290 is also in communication with an engine speed sensor 292 that is configured to detect the current engine speed (e.g., the actual engine speed as measured by the engine speed sensor 292). The engine controller 290 can utilize the engine speed sensor 292 to detect if the power source 222 has reached the target operational speed, or if adjustments to the operational parameters of the engine are needed to correct any error between the target operational speed and the current engine speed as sensed by the engine speed sensor 292. In some cases, an engine speed sensor can directly measure engine RPM and thereby determine engine speed. In some cases, an engine speed sensor can operate in other known ways to derive an exact or approximate engine speed.

In the illustrated embodiment, as generally noted above, the controller 310 is configured as a computing device that can implement indirect electronic control of the engine speed of the power source 222, independently of the engine controller 290, by modifying commands for one or more work elements based on electronic inputs from input devices (e.g., from the operator control devices 260, as shown in FIG. 2). Accordingly, the controller 310 includes a processor device 312 (e.g., a general or special purpose electronic processor) and a memory 314 that can store executable instructions for execution by the processor device 312, as well as various electronic input and output interfaces. Thus, the controller 310 is generally configured to receive electronic signals from and provide electronic signals to various other components, including to provide electronic output signals (i.e., commands) to one or more work elements.

The controller 310 is also in communication with one or more of the operator control devices 260 and one or more work elements. In the illustrated embodiment, the one or more work elements are configured as part of the power conversion system 224 (see also, FIG. 4). In particular, the illustrated work elements of this example include a first work element configured as one or more hydraulic drive pumps (e.g., the hydrostatic drive pumps 224A, 224B) that are configured to power tractive elements, and a second work element configured as an implement pump 224C to power actuators for implement functions (e.g., tilt actuators, lift actuators, etc.). The controller 310 is configured to receive input commands for operation of the work elements and then control operation of the work elements based on those commands. For example, an operator can provide an input command to a drive control lever included as one of the operator control devices 260. The controller 310 can receive those input commands and provide corresponding control signals (e.g., displacement commands) to the drive pumps 224A, 224B, which in turn, can power tractive elements to provide mobility to the power machine 200. For example, for a variable displacement drive pump, the controller 310 can command movement of a spool valve to provide a particular pump displacement. According to another example, the operator can provide input commands to an implement control lever included as part of the operator control devices 260, the controller 310 can receive those input commands and can provide corresponding control signals to the implement pump 224C, which in turn, can power movement of one or more implements (e.g., via the work actuator circuit 238C, as shown in FIG. 4).

The power conversion system 224, among other work elements such as engine accessories (e.g., engine fan, air conditioning systems, etc.), are operatively coupled to the engine 222 and thereby consume power (or torque) produced by the power source 222. Correspondingly, as generally discussed above, particular operator inputs can correspond to particular power or torque demands on the engine 222 via actuation of work elements based on those inputs. For example, the drive pumps 224A, 224B can be hydraulic variable displacement pumps, and the magnitude of displacement, as dictated by operator commands, can correspond to a magnitude of power consumption by the drive pumps 224A, 224B. According to another example, the implement pump 224C can be a hydraulic fixed displacement pump, and a magnitude of an associated pressure relief setting can correspond to a magnitude of power consumption.

In some embodiments, the controller 310 can be configured as multiple controllers. For example, as shown in FIG. 5, the controller 310 can include a hub controller 320 and a drive controller 322. In the illustrated configuration, the hub controller 320 includes the processor 312 and the memory 314, can receive inputs from the operator control devices 260, the engine controller 290, and the engine throttle 316, and can also generally serve as a central controller for coordination of a variety of other power machine systems and functionality (e.g., HVAC, telematics, lighting, and other systems). The drive controller 322 includes a processor 324 and a memory 326, can be in communication with the hub controller 320 to send and receive operational data, and can be configured to provide commands to the power conversion system 224, including as based on signals routed to the drive controller 322 from the hub controller 320 (e.g., as may correspond to engine speeds, throttle settings, input commands from the operator control devices 260, and so on).

As also generally discussed above, a variety of other controller architectures are possible. Accordingly, in discussion below, unless a particular controller is specified as a dedicated controller, it should be understood that any given controller can be implemented as a dedicated or integrated controller. Similarly, unless specified to the contrary, discussion of the execution of a particular operation by a particular controller inherently includes discussion of the execution of part or all of the particular operation by a different controller, including a different dedicated controller or a different controller that the particular controller is part of.

Figure 6:
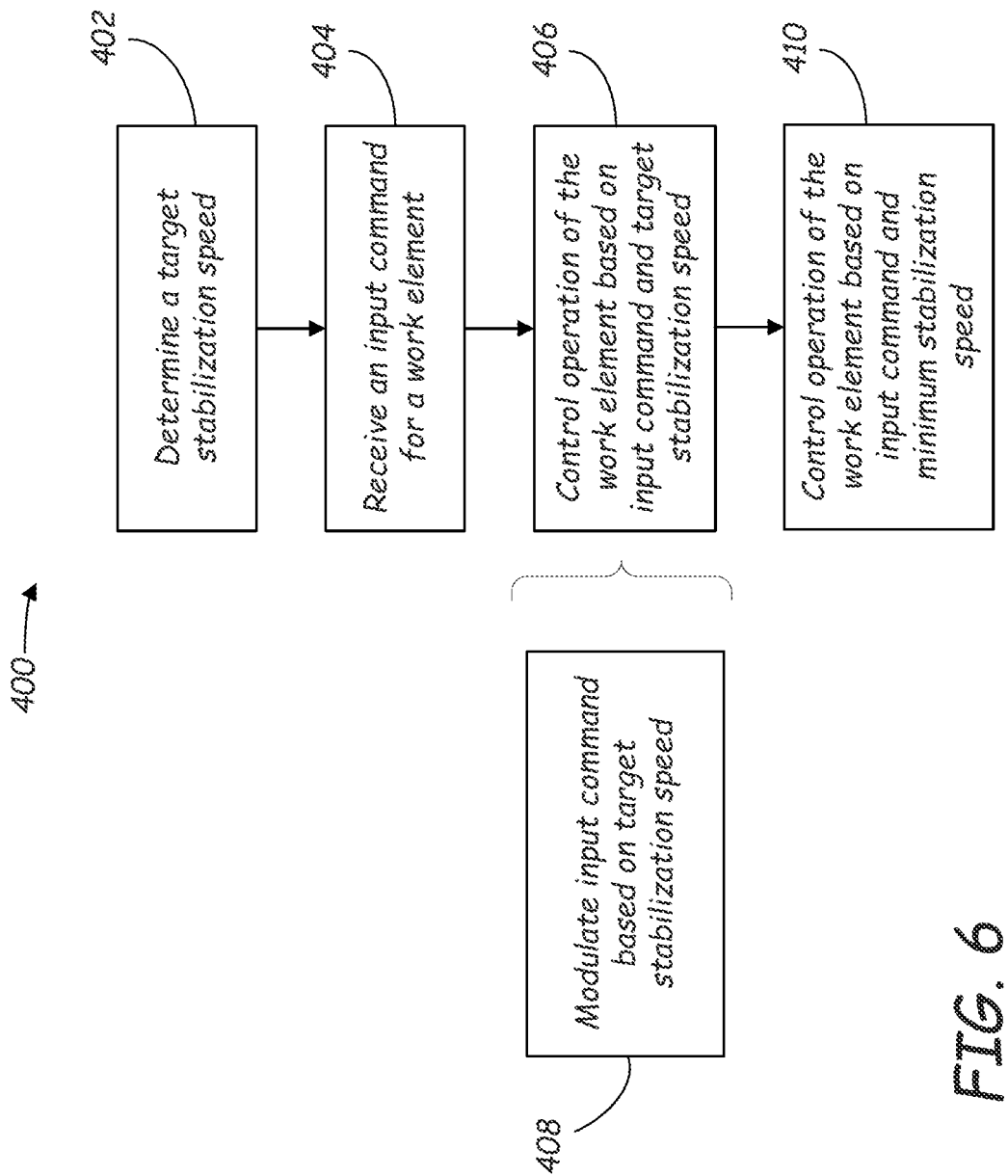
FIG. 6 is a flow chart diagram of a method for controlling an engine and a work element according to some of the disclosed embodiments.

Referring now to FIGS. 5 and 6, the controller 310 is configured to execute a control strategy 400 (see FIG. 6) that functions to maximize power delivered to some work elements (e.g., tractive elements), while maintaining serviceable function of other work elements (e.g., workgroup or accessory elements) in situations where the power or torque demand on the engine is more than the engine can supply at the target operational speed set by the engine controller 290. During operation of the power conversion system 224, the power consumed by the power conversion system 224 can sometimes cause a droop condition due to the corresponding load on the power source 222. In response, the engine controller 290 will function to attempt to recover from the droop condition, i.e., to maintain the relevant target operational speed, by increasing engine torque. In some cases, however, the cumulative power demands from the work elements may be more than the maximum power output the engine can supply at the target operational speed. In this case, as further detailed below, the controller 310 can operate to cause the engine to settle towards a target stabilization speed, rather than towards the target operational speed, with the target stabilization speed corresponding to a predetermined target amount of droop below the target operational speed. Thus, in some cases, a power machine can be caused to avoid the unpredictable equilibrium behavior of an over-capacity engine (as also discussed above) or other detrimental effects inherent to conventional control systems, and to provide optimal (e.g., maximum) power delivery to one or more particular work elements (e.g., drive pumps).

More specifically, in some cases, the controller 310 can begin by determining 402 a target stabilization speed that is below the target operational speed and that corresponds to a particular power-delivery profile for current operating conditions of a power machine (e.g., loading of a workgroup, engine speed, throttle position, etc.). The controller 310 can then receive 404 an input command from the operator control devices 260 for the operation of one or more work elements of the power machine 200. Upon receiving 404 the input command, the controller 310 can output 406 commands to the work elements (e.g., to the drive pumps 224A, 224B) to control operation of the work elements. However, rather than simply provide output 406 commands that correspond directly to receive 404 input commands (e.g., maximum drive pump displacement for a maximum traction power demand by an operator), the controller 310 can first modulate 408 the input command based on the determined 402 target stabilization speed.

For example, as further discussed below, maximum power delivery to a tractive element at a particular throttle position and current non-drive load (e.g., from workgroup and accessory elements) may correspond to a particular engine speed that is below a target operational speed (i.e., a particular target stabilization speed). Further, the particular engine speed, in turn, may correspond to a particular displacement or torque setting at a drive pump at a current throttle setting and non-tractive load on the engine. Accordingly, the controller 310 can scale operator-initiated commands to the drive pump so that a maximum power command by the operator corresponds to the particular displacement or torque setting at the drive pump, and other power commands by the operator can be scaled correspondingly downward from the default (i.e., un-modulated) value. In this way, for example, as the operator commands maximum drive power from an at- or over-capacity engine, the relevant tractive elements can be controlled so that maximum available power is nonetheless delivered to relevant tractive elements and, correspondingly, the engine is pulled toward the target stabilization speed rather than toward a target operational speed (again, generally in opposition to the speed recovery efforts by the engine controller 290).

Figure 7:
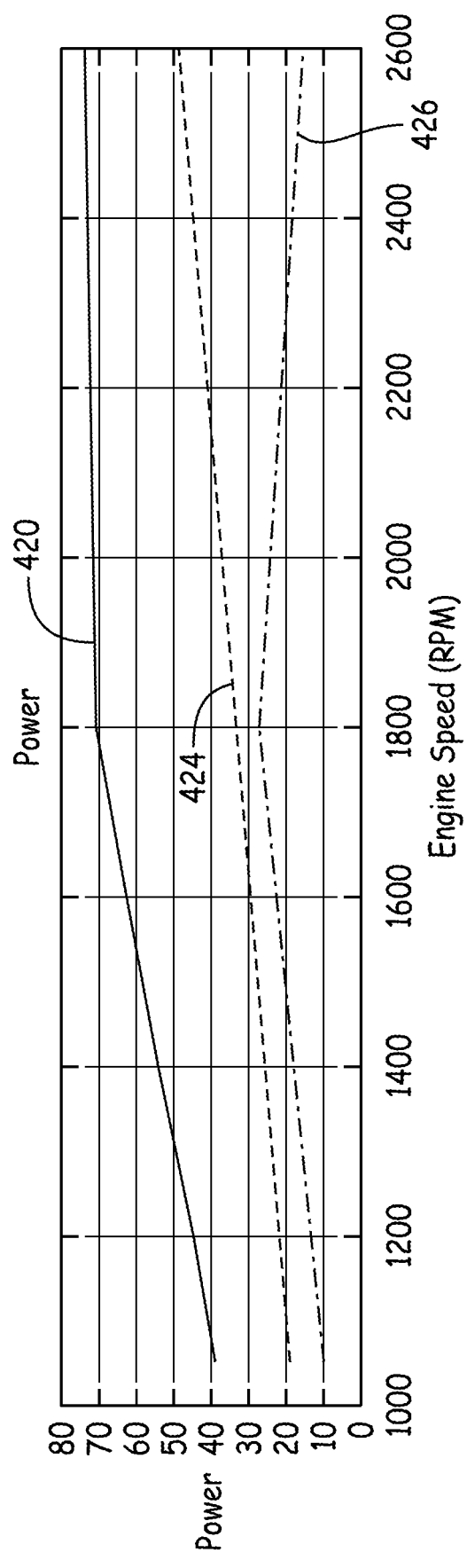
FIG. 7 depicts graphs illustrating example power and torque curves of an engine of a power machine.
Figure 7:
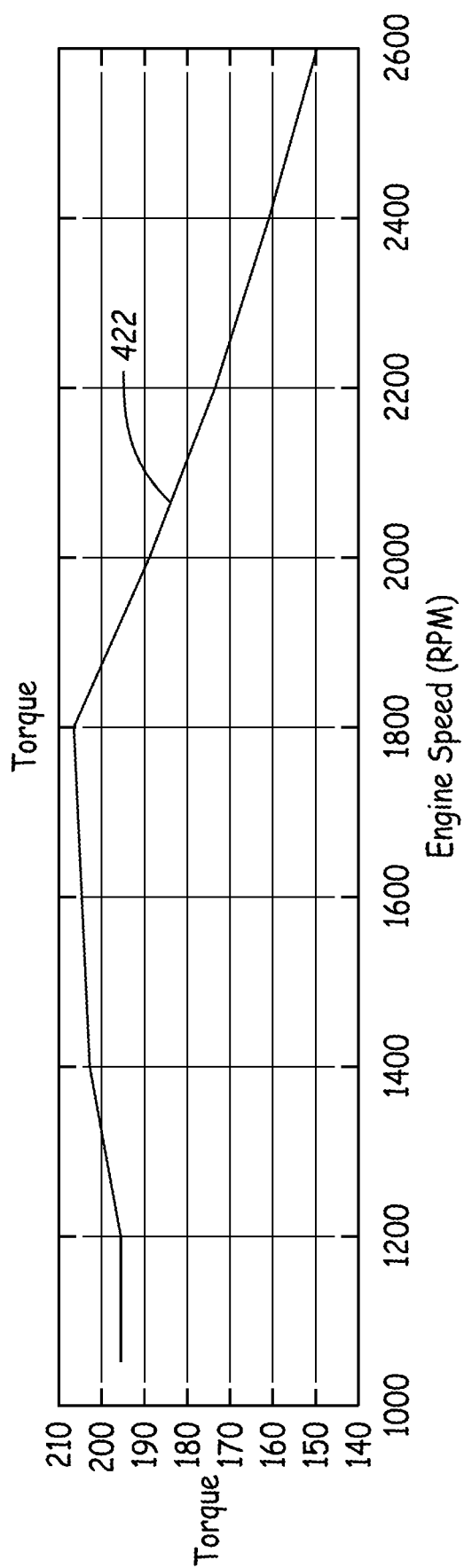

In some embodiments, target stabilization speeds for particular operating conditions (e.g., particular throttle settings and workgroup loads) can be determined (e.g., predetermined) based on known operating conditions of a power machine. In this regard, referring also to FIG. 7, example power and torque curves for the engine 222 are illustrated, along with example power demands from and power availability for work elements at varying engine speeds. In particular, the curves of FIG. 7 illustrate torque and power for operation of the engine 222 at full throttle, power demand from operation of a fixed displacement non-drive load (e.g., from implement pumps and an engine fan) at full relief, and the corresponding available power for tractive elements. However, similar curves can be constructed for other operating conditions (e.g., other throttle settings, other non-drive loads, etc.).

Typically, the engine controller 290 (see FIG. 5) may set a target operational speed at a point where peak power is produced. In the example of FIG. 7, the target operational speed set by the engine controller 290 (see FIG. 5) is 2600 RPM, as may correspond to maximum power from the engine at full throttle, but not necessarily to maximum engine torque. Although the engine controller 290 may generally try to maintain the target operational speed of 2600 RPM, if cumulative power demands from work elements exceed the capacity of the engine at the target operational speed, the engine may enter a droop condition. For example, during operation of the implement pump 224C at a maximum torque (e.g., at a full relief pressure) and the drive pumps 224A, 224B at maximum displacement, power demands may exceed engine capacity and engine speed may begin to droop.

As also discussed above, although such engine droop is conventionally considered to be unfavorable for power machine operation, embodiments of this disclosure can operate to provide a targeted amount of engine droop to provide improved power delivery. With continued reference to FIG. 7, for example, lines 420 and 422 illustrate, respectively, the power and torque produced by the engine 222, line 424 illustrates the power consumed by the implement pump 224C (and, in some cases, other non-drive loads), and line 426 illustrates the power available to the drive pumps 224A, 224B. That is, line 426 is representative of the power generated by the power source 222 less power consumed by the implement pump 224C (and any other loads on the engine, such as engine accessory loads). In this example, there is a clear inflection point in the total power output provided by the engine at about 1800 RPM. In particular, the rate of increase of the power output from the power source 222 is reduced above 1800 RPM. In contrast, power demand from the implement pump 224C continues to increase linearly with engine speed (e.g., due to constant-displacement operation at relief pressure). As a result, although more power is being produced by the engine 222 at higher RPMs (e.g., approaching 2600 RPM), less power is available for the drive pumps 224A, 224B to power tractive operations.

When engine speed begins to droop, operation of the engine controller 290 (see FIG. 5) will generally attempt to return the engine to the target operational speed (e.g., 2600 RPM). As generally noted above, under conventional approaches, lack of available torque to allow an engine return to the target operational speed may result in the unpredictable settling of engine speed at any of a variety of values, with corresponding detrimental effects. However, as also generally discussed above, the controller 310 (see FIG. 5) can be configured to modulate input commands for tractive elements in order to pull the engine speed toward the target stabilization speed (e.g., 1800 RPM). This modulation of operator commands, based on target stabilization speed, can help to ensure that engine speed moves toward a preferred stabilization point, and optimal (e.g., maximum) power is provided to the tractive elements.

Relative to the example of FIG. 7, in particular, the controller 310 can determine the target stabilization speed to be about 1800 RPM, as corresponds to a target droop of about 800 RPM. Further, based on known characteristics of the relevant tractive elements and the engine (e.g., as indicated by predetermined performance curves), the controller 310 can determine a displacement (or torque) limit for the tractive elements that corresponds to the available engine power at the target operational speed (or target droop). Therefore, in accordance with the control strategy 400 of FIG. 6, the controller 310 can modulate operator input commands so that a maximum torque command for the tractive elements corresponds to the determined displacement (or torque) limit and, correspondingly, to the maximum available power from the engine for the tractive elements. As appropriate, the controller 310 can then continue to function similarly over changing operational conditions (e.g., changing workgroup loads), to prevent the engine controller 290 from recovering toward the target operational speed (e.g., 2600 RPM) for as long as the unmodulated power demands for relevant work elements would exceed engine capacity.

In the illustrated example, the target stabilization speed substantially corresponds to an engine speed that results in a maximum overall torque, as well as maximum available power at the drive pumps 224A, 224B during operation of the constant-displacement implement pump 224C. In this regard, the target stabilization speed can sometimes be within 10% (e.g., within 5% or within 1%) of an engine speed that provides maximum overall torque or maximum power at the drive pumps 224A, 224B for a given throttle position and non-tractive load. However, other limits to target stabilization speed are also possible.

Although full-relief operation of workgroup elements at full throttle (as shown in FIG. 7) may be a common operating condition (e.g., during grading, digging, etc.), a variety of other operating conditions are also possible. Further, an optimum value for a target stabilization speed may vary not only between different power machines but also between different operating conditions. Accordingly, it may be useful in some cases to predetermine target stabilization speeds for a variety of operating conditions (or power machine configurations), so that the controller 310 can select a particular target stabilization speed that may be optimal for a present operating condition. In some embodiments, target stabilization speeds for particular operating conditions can be determined based on a variety of factors, including current workgroup torque load, current throttle position, and general performance characteristics of an engine and relevant work elements. Examples of other relevant work elements include a charge pump torque load and an auxiliary torque load.

In some cases, predetermined target stabilization speeds can be stored in a lookup table (e.g., an array of values in the memory 314 (see FIG. 5)), which can then be referenced by the controller 310 to determine a relevant target stabilization speed for a particular operating condition (e.g., particular throttle setting and non-drive torque load). Some implementations can include predetermined target stabilization speeds for a limited number of throttle settings (e.g., full throttle and low idle), workgroup loads (e.g., full load and zero load), or other operating conditions and target stabilization speed can be determined for other operating conditions (e.g., other workgroup loads) via numerical interpolation.

Referring again to FIG. 6, in some embodiments, the controller 310 can also operate to help prevent engine stall due to over-reduction of engine speed. For example, if the engine speed droops below a certain speed (e.g., engine speeds at or lower than the point of peak torque), the engine 222 may not be able to recover and may therefore stall. To avoid this, for any particular operating condition, the controller 310 can sometimes determine a minimum stabilization speed (e.g., corresponding to a maximum engine droop) that is different from the target stabilization speed and can further control 410 operation of a work element (e.g., the drive pumps 224A, 224B) to prevent the speed of the engine 222 from falling below the minimum stabilization speed. For example, operator commands for a tractive element can be further modulated, based on a minimum stabilization speed, so that commands from an operator for maximum drive torque can be implemented only under displacement (or torque) limits that are not likely to cause engine stall. In other words, a maximum droop may be set and the controller 310 may control 410 work elements, based on modulation of operator input, to not allow the power source 222 to exceed a maximum droop. In some cases, similar to target stabilization speeds, minimum stabilizations speeds can also be predetermined and then identified during operation by reference to look-up tables stored in memory.

Generally, a target stabilization speed will be larger than a minimum stabilization speed, so that modulated control of a work element based on the target stabilization speed does not risk engine stall. Further, in some cases, a minimum stabilization speed may correspond to a point of peak torque for an engine under particular operating conditions. Correspondingly, in some cases, a target stabilization speed may not always equate to a speed that provides maximum engine torque, or to a speed that corresponds to maximum power delivery for a tractive element. In other words, a target stabilization speed may sometimes be too high a speed to provide maximum power delivery, in order to avoid pulling the engine toward a stall condition. Thus, as also discussed above, a target stabilization speed can be more generally considered as a speed that can provide optimal power delivery to tractive elements, rather than necessarily a speed that provides maximum power delivery to tractive elements. Of note, as shown in FIG. 7 by the negative slope of the example line 426 at higher engine speed, operation of the controller 310 to pull engine speed away from the target operational speed may still serve to increase available power for tractive elements even if a target stabilization speed is higher than a speed for maximum power delivery to the tractive elements.

Figure 8:
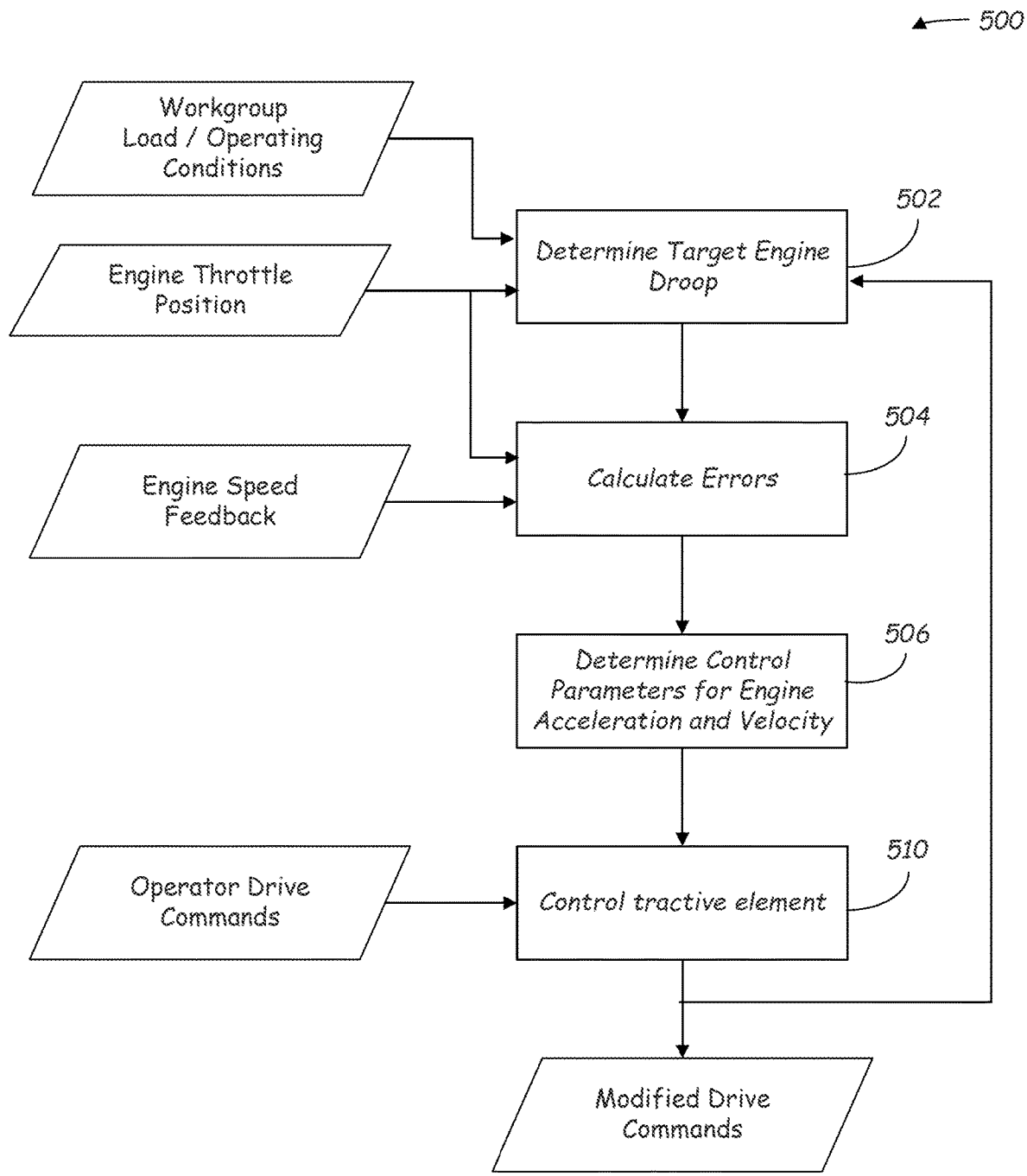
FIG. 8 is a flow chart diagram of an example method for controlling an engine and a work element according to some of the disclosed embodiments.

Referring now also to FIG. 8, an example algorithm 500 is presented, as may be generally executable by the hub controller 320 and the drive controller 322, alone or in combination with other controllers, to control engine speed via control of work elements (e.g., the drive pumps 224A, 224B), separately from control of engine speed by the engine controller 290. In particular, the algorithm 500 can operate by calculating a target engine droop that corresponds to a target stabilization speed as discussed above, and then modulating operator control based on the target engine droop and other inputs. In other embodiments, however, similar control can be implemented based directly on target stabilization speed, without expressly calculating a target droop (or vice versa). Further, as with other examples above, although the example algorithm 500 is presented relative to control engine speed via control of tractive elements, some embodiments can control other work elements in a similar manner, for example, by controlling a variable displacement implement pump or any power consuming function such as reducing power consumption of the charge pump via a reduction in fan speed.

In the illustrated example, the algorithm 500 can begin by determining 502 a target engine droop based on current operating conditions, e.g., as indicated by a current torque load from work elements, a current throttle setting, etc. In some embodiments, a hub controller can determine 502 the appropriate target engine droop by first identifying a target stabilization speed. For example, as discussed in detail above and represented generally in FIG. 8, a target stabilization speed (and thereby target engine droop) can be determined based on a current engine throttle position and current workgroup torque load, and other factors. A target engine droop for current operating conditions for a power machine can then be identified as a difference between the target stabilization speed and a target operational speed—i.e., as indicating a decrease in engine speed that is required to move from the target operational speed to the target stabilization speed.

In some cases, to inform determining 502 a target engine droop, a torque load (e.g., from the implement pump 224C) can be estimated by sensing a pressure (e.g., at an output from the pump 224C) and correlating that pressure to a torque load. In some cases, a torque load can be estimated by detecting a position of an operator control device (e.g., an operator lever position, or spool position, etc.) or receiving a position signal from a spool valve, and correlating the relevant position to a torque load. In some cases, a target operational speed for a particular operating condition can be received at a hub controller from an engine controller (or other source), or can be derived from a position of an engine throttle or other inputs, based on known characteristics of a power machine or engine.

With a target engine droop having been determined 502, the algorithm can proceed to calculate 504 relevant errors between actual and target values. For example, a hub controller can determine an engine speed error that indicates a difference between a current engine speed and the target stabilization speed (e.g., as expressed as a different between current engine droop and target engine droop). Thus, an engine speed error can generally indicate whether an engine speed is at or near a target stabilization speed. Likewise, for example, the magnitude of an engine speed error can indicate a degree to which an engine speed may need to be pulled, by control of a work element, toward a target stabilization speed.

In some cases, as part of an implementation of the algorithm 500, a controller can also calculate 504 an error in engine acceleration (i.e., in change in engine speed over time). In some cases, predetermined control strategies can indicate preferred engine accelerations relative to particular speed errors, and calculated 504 acceleration errors can correspondingly indicate a rate at which control of a work element should be used to pursue a target stabilization speed. For example, larger-magnitude engine acceleration values may be beneficial if an engine is in a droop condition but has a current speed that is substantially larger than a target stabilization speed, so that the engine speed can be pulled relatively quickly toward the target stabilization speed. In contrast, as speed error diminishes, i.e., as current engine speed approaches a target stabilization speed, smaller-magnitude engine acceleration values may be beneficial, to minimize overshoot of engine speed past (e.g., below) the target stabilization speed. In this regard, for example, target engine acceleration values can be tuned to proscribe a particular overall, and damping, behavior relative a target stabilization speed, for particular power machines or operating conditions.

Consideration of acceleration errors can also improve control in other ways. For example, at low loads, engine droop may sometimes occur even with only small load increases. Implementing control based on acceleration errors can allow these types of transient droop conditions to be ignored, or at least addressed with less aggressive control response. Similarly, high values of actual engine acceleration may sometimes indicate that a droop condition may be imminent, even if engine speed error is negligible or even negative. As appropriate, control of work elements can then be proactively implemented (or prepared) accordingly.

Generally, target droop and related parameters (e.g., speed and acceleration errors) can be determined continuously during operation of a power machine, as can other related control parameters. However, as also generally discussed above, modulation of operator commands to control engine speed may generally be implemented only when an engine is overloaded. Accordingly, for example, some determined 502 target droop values may not actively inform modulation of operator commands. Also, determined 502 target droop values are generally not used to control engine speed in the absence of relevant operator commands.

Further, in some cases, target droop can be modified based on a maximum droop value. For example, if engine stall is expected below a particular speed for a particular throttle setting (or other operating condition), a target engine droop that is initially determined 502 as described above can be further modified (e.g., reduced in magnitude) to help ensure that control of work elements based on the target engine droop does not pull engine speed toward a stall. In this regard, control based on a maximum engine droop can be effectively identical to control based on minimum stabilization speed, as discussed above.

Continuing with reference to FIG. 8, the algorithm 500 can further include determining 506 engine acceleration and velocity control parameters based on the calculated 504 errors. For example, appropriate gains can be provided for the velocity and acceleration errors as may correspond to relevant torque or displacement limits for a relevant work element (e.g., the drive pumps 224A, 224B). In some cases, as generally discussed above, torque and displacement limits can be determined for a particular power machine or operating condition so as to pull engine speed toward a target stabilization speed (e.g., with a target engine acceleration) that can provide optimal power delivery for particular (e.g., tractive) work elements.

Upon receiving operator commands (e.g., drive commands as shown), the algorithm 500 can further include controlling 510 relevant work elements (e.g., tractive elements, as shown) based on the drive commands and the determined 506 control parameters. For example, a drive controller can receive operator drive commands that correspond to a particular commanded drive pump displacement (e.g., via a commanded spool position). The drive controller can then modify (e.g., linearly scale) the drive commands based on the torque/displacement limits received by the hub controller 320 and provide the modified commands to the relevant work element. Thus, for example, when an operator commands maximum displacement of a drive pump, the drive pump may actually be controlled 510 to operate at a lower displacement, to provide a load that can pull the engine toward a target stabilization speed (or target droop).

As generally indicated in FIG. 8., one or more operations of the algorithm 500 can be repeated, e.g., continuously, during operation of a power machine. Correspondingly, in some cases, certain operations in one cycle of the algorithm 500 can influence operation of a subsequent cycle of the algorithm 500. For example, as part of determining 506 control parameters for engine acceleration and velocity, the algorithm 500 may include determining 506 a particular target engine acceleration. In some cases, this target engine acceleration may then subsequently inform calculation 504 of an acceleration error, as may in turn inform subsequent determination 506 of updated control parameters (e.g., to more aggressively pull engine speed toward a target stabilization speed if acceleration errors are large).

In some embodiments, aspects of this disclosure, including computerized implementations of methods according to this disclosure, can be implemented as a system, method, apparatus, or article of manufacture using standard programming or engineering techniques to produce software, firmware, hardware, or any combination thereof to control a processor device or a computer (e.g., a processor device operatively coupled to a memory) to implement aspects detailed herein. Accordingly, for example, some embodiments can be implemented as a set of instructions, tangibly embodied on a non-transitory computer-readable media, such that a processor device can implement the instructions based upon reading the instructions from the computer-readable media. Some embodiments can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to some embodiments, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers, controllers, or other processor devices, or may be included within another component (or system, module, and so on).

Although the present invention has been described by referring to preferred embodiments, workers skilled in the art will recognize that changes may be made in form and detail without departing from the scope of the discussion.

What is claimed is:

1. A method of managing operation of an engine of a power machine, the method comprising:

determining, with one or more computing devices, a target stabilization speed for the engine, the target stabilization speed being slower than a target operational speed for the engine, wherein an engine controller is configured to control operation of the engine based on the target operational speed;

receiving, at the one or more computing devices, an input command for operation of a work element of the power machine; and with the one or more computing devices, while the engine controller is controlling the engine to operate at the target operational speed, controlling operation of the work element based on the target stabilization speed and the input command to cause the engine to operate below the target operational speed.

2. The method of claim 1, wherein controlling the operation of the work element includes reducing an output signal for control of the work element below a default output signal corresponding to the received input command, based on the target stabilization speed.

3. The method of claim 2, wherein controlling the operation of the work element includes scaling the output signal relative to the received input command based on one or more of a displacement limit for the work element or a torque limit for the work element.

4. The method of claim 3, wherein controlling the operation of the work element includes scaling the output signal also based on a minimum stabilization speed for the engine.

5. The method of claim 2, wherein the work element is a drive pump powered by the engine.

6. The method of claim 5, wherein the engine is further configured to power an additional work element; and
wherein controlling operation of the drive pump to cause the engine to operate below the target operational speed causes a reduction in power delivery from the engine to the additional work element as compared to operation of the engine at the target operational speed.

7. The method of claim 1, wherein the engine controller is configured to increase engine torque to increase engine speed toward the target operational speed; and
wherein controlling operation of the work element based on the target stabilization speed and the input command causes the engine to operate below the target operational speed without causing the engine controller to change the target operational speed.

8. A power machine comprising:
a main frame;
a power source configured to provide a rotational output;
a first work element configured as a hydraulic drive pump of a hydraulic drive system, supported by the main frame and powered by the power source;
and
a control system that includes:
a power source control module configured to control operation of the power source based on a target operational speed of the rotational output of the power source; and
a drive control module configured to control operation of the hydraulic drive pump based on an operator input for operation of the hydraulic drive system and on a target stabilization speed for the rotational output of the power source that is lower than the target operational speed, to reduce a current speed of the power source toward the target stabilization speed as the power source control module controls the power source to operate at the target operational speed.

9. The power machine of claim 8, wherein the power source is configured as an internal combustion engine.

10. The power machine of claim 8, wherein the power source is configured as an electric motor.

11. The power machine of claim 8, wherein the power machine further includes a second work element that is supported by the main frame and powered by the power source, and
wherein the drive control module is configured to determine the target stabilization speed to correspond to a maximum power delivery to the hydraulic drive pump, from the power source, during operation of the second work element.

12. The power machine of claim 11, wherein the second work element is an implement pump.

13. The power machine of claim 12, wherein the implement pump has a fixed displacement.

14. The power machine of claim 8, wherein controlling operation of the hydraulic drive pump based on the target stabilization speed includes determining a target droop that corresponds to the target stabilization speed.

15. The power machine of claim 8, wherein controlling operation of the hydraulic drive pump based on the target stabilization speed for the rotational output of the power source includes determining one or more of:
a velocity error between an actual speed of the rotational output and the target stabilization speed; or
an acceleration error between an actual change in speed of the rotational output and a target change in speed.

16. The power machine of claim 8, wherein the drive control module is further configured to:
determine a minimum stabilization speed less than the target stabilization speed; and
control operation of the hydraulic drive pump to prevent the speed of the rotational output of the power source from stabilizing below the minimum stabilization speed due to commanded loads on the hydraulic drive pump.

17. A control system for a power machine with an engine, a first hydraulic work element that is powered by the engine, and a second hydraulic work element that is powered by the engine, the control system comprising:
an input device configured to receive commands for operation of the first hydraulic work element;
an engine speed sensor configured to determine current engine speed; and
one or more electronic control devices configured to:
receive an operator command for operation of the first hydraulic work element;
receive an indication of the current engine speed; and
determine a target stabilization speed for the engine based on a current load for the second hydraulic work element and a current throttle setting, the target stabilization speed being slower than a target operational engine speed for the engine; and
control operation of the first hydraulic work element, including modulating the operator command for the first hydraulic work element based on the target stabilization speed
in response to a load on the engine causing the current engine speed to droop below the target operational engine speed.

18. The control system of claim 17, wherein modulating the operator command for the first hydraulic work element is based on one or more of:

an engine speed error that indicates a difference between the current engine speed and the target stabilization speed; or an engine acceleration error that indicates a difference between a current engine acceleration and a target engine acceleration.

19. The control system of claim 18, wherein the first hydraulic work element is a hydraulic drive pump; and wherein controlling the first hydraulic work element based on the target stabilization speed further includes setting one or more of a displacement limit or a torque limit for the first hydraulic work element based on the target stabilization speed.

20. The control system of claim 19, wherein the target stabilization speed is greater than a minimum stabilization speed corresponding to an engine speed at which peak torque is provided by the engine.

* * * * *